Aug. 20, 1946.　　　P. A. BAYLESS　　　2,406,187
PNEUMODYNAMIC EXTRACTOR
Filed Aug. 24, 1942　　　4 Sheets-Sheet 1

Center of Gravity with Balanced Load.

Patented Aug. 20, 1946

2,406,187

UNITED STATES PATENT OFFICE 2,406,187

PNEUMODYNAMIC EXTRACTOR

Patrick A. Bayless, Syracuse, N. Y.

Application August 24, 1942, Serial No. 455,945

9 Claims. (Cl. 210—66)

This invention relates to pneumodynamic extractors and has particular reference to extractors for separating liquids, moistures, vapors, residues and odors from solids by the combined action of centrifugal force and air currents.

The present device is applicable to many industrial fields such as the textile, dye, laundry and dry cleaning fields; the removal of oil from metal turnings and chips, the extraction of juices or liquids from fruit and roots, and many similar uses too numerous to mention.

Heretofore, commercial extractors such as those used in laundries have consisted essentially of a cylindrical basket having perforated side walls to permit the water to escape from the material being dried as the basket is rotated at a high speed. This cylindrical basket rotates within a curb or housing which is also cylindrical in shape and concentric with the axis of the basket. The perforations or holes in the wall of the basket are approximately only 5% of the total area of the basket wall, thus leaving approximately 95% dead or solid area past which the water must flow to be ejected by centrifugal action through the holes. With this high ratio of solid area to the area of the perforations, it is obvious that a great deal of energy must be expended to effect a separation of the liquids from the solids in the basket. (See article entitled "Do you know your extractor's inside story?" by A. G. Stovale, The Laundryman, May 1941.) While some air is drawn into the basket, it has very little if any drying effect except possibly on the exposed surfaces of the clothes. Tests referred to in the above identified article clearly indicate that sufficient air does not penetrate through the load to cause any appreciable drying effect.

I have discovered that this lack of air draft in sufficient volume to effect a drying action is due primarily to incorrect design of the extractor. The cylindrical shape of the curb or housing surrounding the rotary basket causes an air pressure to be built up between the cylindrical walls of the housing and the perforated walls of the basket, thus creating a back pressure which substantially counter-balances the normal pressure of air currents that tend to flow through the open top of the basket and out of the perforated side walls. This back pressure thus prevents the normal flow of air through the extractor basket. Furthermore, the pressure built up between the housing and basket and the lack of a positive air draft through this space also causes the extracted fluids passing from the basket to the walls of the housing to rebound and again strike the rotating basket, thereby seriously impeding the drying action of the extractor.

Laundry extractors of this general class are supposed to be loaded as evenly as possible so that the entire weight of the material will be uniformly distributed in the basket. However, it is a practical impossibility to load nets containing material, or material in the bulk, in this manner. This unbalance may vary from the equivalent of 10 to 25 pounds at the periphery of the basket for a 48-inch basket. With a 10-pound unbalance at a speed of 860 R. P. M., a 48-inch basket will develop an additional strain of 5,044 pounds on the side sheet and bearings which often causes severe vibrations, noise and wear on the parts of the extractor, to say nothing of the danger to the operator and others due to these unbalanced forces.

As has been pointed out in an article entitled "Engineering principles in extractor construction" by J. S. Sando, pages 16–19 of "A Laundry Exhibit for 1930," all extractors are designed to relieve the aforementioned strains and may be classified as "restrained" or "unrestrained" types. If the material in the extractor basket is unevenly loaded which is most always the case, the center of gravity of the basket will not coincide with the center of the spindle, however, the basket will rotate about the center of gravity thereby producing a gyrating movement. The "restrained" type, which does not absorb vibrations in a vertical plane, is usually confined to the small machines in which the basket does not exceed 30 inches in diameter. Even with the use of rubber to partially absorb the vibrations generated, the machine requires a substantial foundation.

It is the general object of the present invention to provide an extractor embodying a novel form of basket wherein the perforations or openings in the side wall of the basket shall constitute a relatively large percentage of the total side wall area and still maintain a strong structure capable of withstanding the relatively high forces exerted on the basket wall by the centrifugal force of the load. This increased area of the basket openings greatly facilitates the extraction or separation of the liquids, moistures, vapors, residues and odors from the solids since the liquids flow a minimum distance along the solid wall area before escaping through the apertures due to the centrifugal force. Furthermore, the extractor basket may be rotated at slower speeds because of its greater efficiency in extraction of the liquids, and thus not only decrease the wear on the various parts, but also reduce the packing of the material. In the case of textiles, this eliminates the hard set wrinkles which are difficult and costly to remove.

Another object is to provide an extractor of the aforesaid character which shall include means for eliminating the aforementioned back pressure between the basket and housing or curb, and which shall therefore permit a free flow of the extracted liquids out of the housing without rebounding as described previously or building up a retarding back pressure in dump tanks. The elimination of such back pressure thus permits a free flow of air through the top of the basket and out the perforations or apertures in the side walls of the basket, which greatly expedites the separation of liquids from the solids and also expedites the drying of the solids by reason of the air draft created through and over the solids within the basket.

Another object is to still further expedite the separation of the liquids from the solids and increase the drying action by including means coordinated with centrifugal force for positively causing a current of air or other drying medium of relatively large volume to pass through and over the solid materials in the basket. Preferably such drying current is created by a plurality of impellers attached to the rotary basket in such manner that a current of air is positively drawn through the materials in the basket and ejected through a moisture and vapor condensing separator to eliminate hazardous inflammable vapors and damaging moisture before being discharged to the atmosphere, meanwhile the extracted liquids passing through a separate outlet in the housing or curb. These impellers not only serve to create a positive draft through the basket but also serve to reinforce the foraminous walls of the basket against the forces created by the centrifugal action of the load in the basket. These impellers in combination with the screen wall of the basket and the application of centrifugal force provide a maximum separation and drying effect on the materials in the basket in a minimum of time and effort. In this manner, drying of the material is greatly facilitated, and in the case of dry cleaning, for example, the material is deodorized and the solvent is precipitated from the air currents and recovered thus effecting a material saving in time and money and eliminating a hazardous condition in the building.

Another object is to provide a novel seal between the housing or curb and the upper perimeter of the rotary basket, such seal acting as a baffle to effectively separate the inflowing air currents through the top of the basket from the air currents which have passed through the foraminous walls of the basket and are being expelled through the fluid discharge outlet of the housing. This seal also prevents the escape of vapors, fumes or moisture from the top of the space between the rotary basket and the housing or curb. A further function of this seal is to prevent the materials in the basket from getting caught or passing down between the basket and the housing.

A further object is to provide a novel mounting for the extractor basket wherein the gyrating movement or oscillations thereof in both the horizontal and vertical planes are confined to the basket and are not transmitted to other parts of the extractor. By confining such gyrating movements to the basket only, less power is used for driving the extractor than when the motor, curb, base, etc., gyrate with the basket and the entire extractor is more quiet in operation and the wear and tear on the parts is greatly reduced. Also with my novel mounting for the basket, the usual supporting posts and rods usually present in the "unrestrained" type of extractor are eliminated and the basket can therefore be loaded or unloaded from any desired position.

A still further object is to provide an extractor of the aforesaid character which shall be relatively quiet in operation and devoid of excessive vibration, thereby relieving the operator and adjacent workers of nerve strain and materially increasing the safety factor for centrifugally operated extractors.

Further and more limited objects and advantages will become appent as the description proceeds and these will be pointed out hereinafter.

In the drawings accompanying and forming a part of this application,

Fig. 5 is a fragmentary vertical sectional view through the upper end portion of the extractor basket and illustrating the cover therefor.

Figure 1:
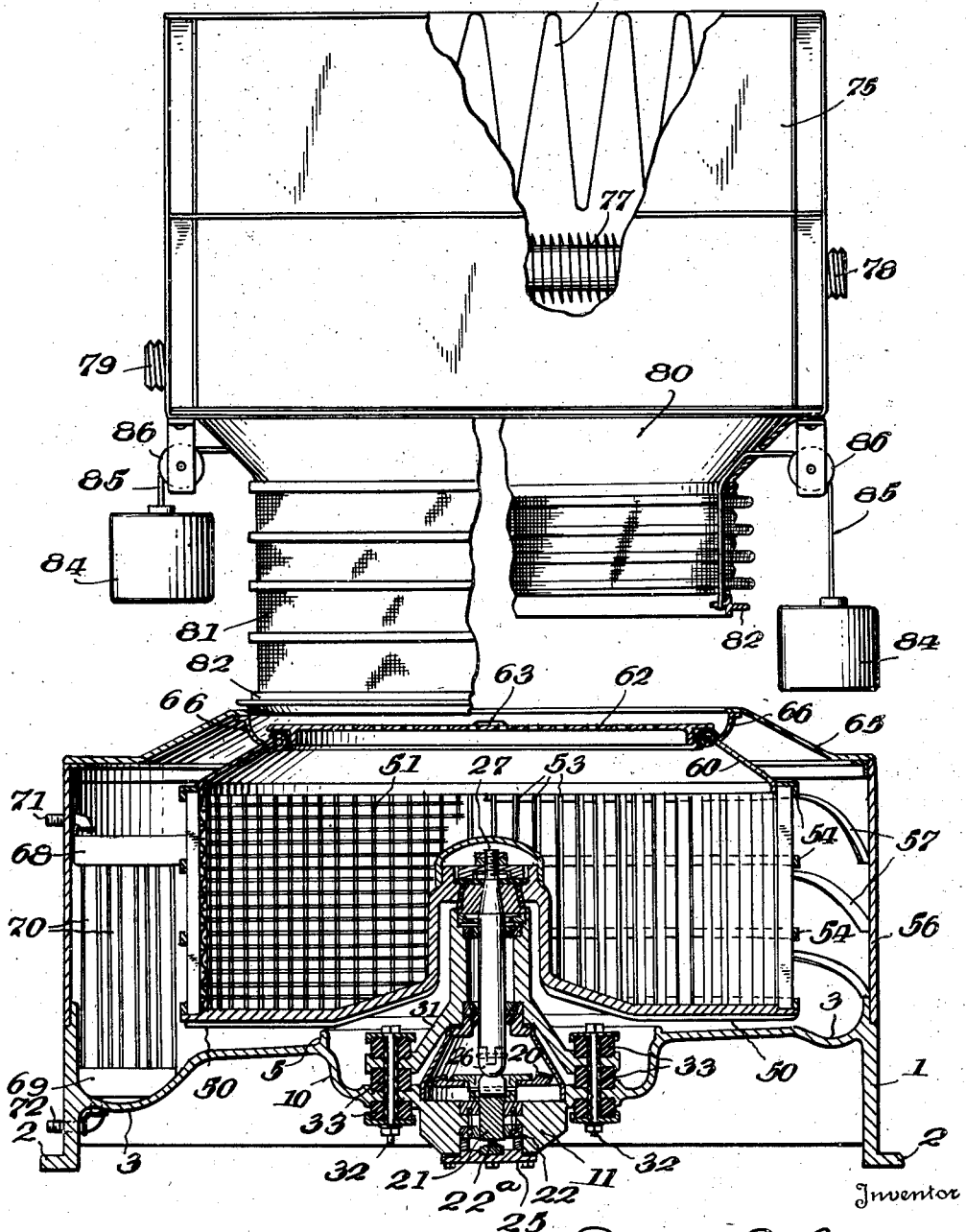
Fig. 1 is a view partly in elevation and partly in section of an extractor constructed in accordance with my invention.

Describing the various parts by reference characters, I denotes the base which is preferably provided with feet 2 that extend below the plane of the base so that the extractor will be raised from the floor a distance sufficient to provide "toe room" for the operator during loading or unloading operations. As shown particularly in Fig. 2, the base is volute in plan view so as to provide a liquid channel 3 of increasing area toward the liquid discharge outlet 4. This channel is illustrated as being substantially semicircular in cross section as shown in Fig. 3, and its depth increases and the bottom surface thereof also slopes downwardly toward the liquid discharge opening 4. An upstanding annular guide ring or collar 5 is formed on the top surface of the base and is spaced inwardly of the liquid channel 3. Intermediate this ring and the channel 3, the surface of the base is provided with a series of spiral-shaped serrations 6 which serve to conduct the liquid that should get between the bucket bottom and the base of the channel 3.

Figure 4:
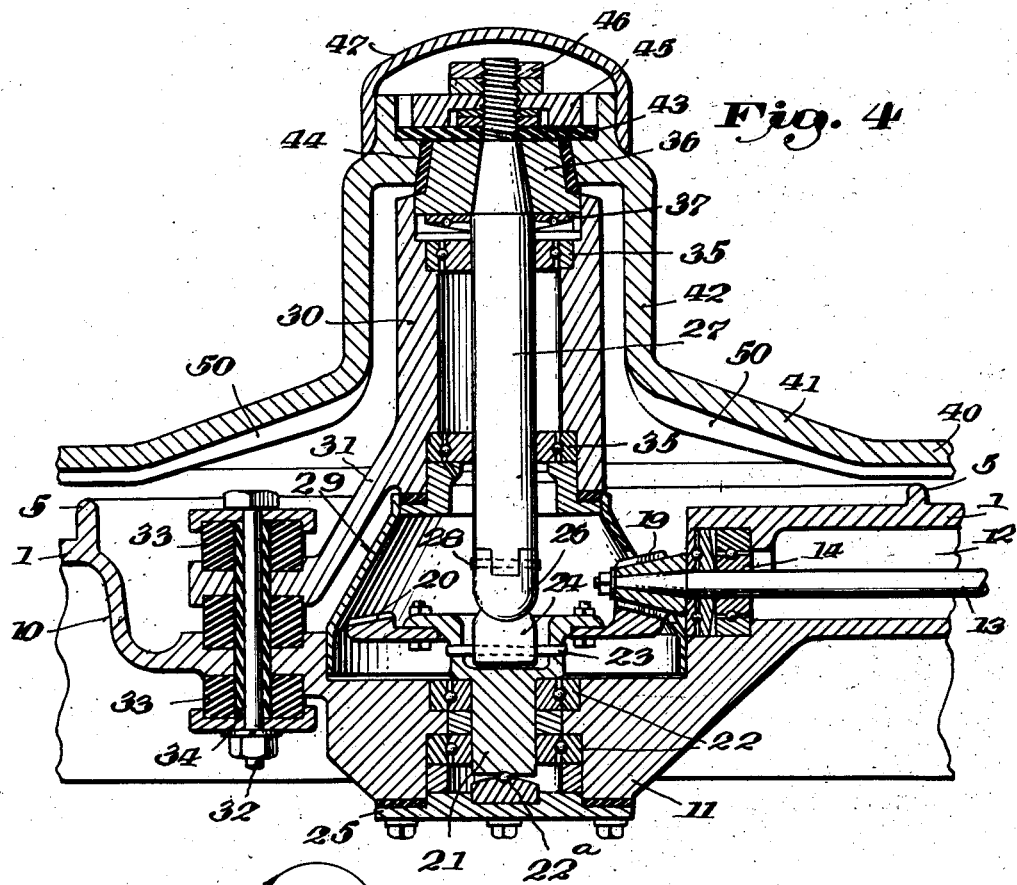
Fig. 4 is an enlarged fragmentary vertical sectional view through the basket spindle support and associated mechanism.

The central portion of the base inside of the guide ring 5 is formed with depending walls 10 which connect with a basket support and drive housing 11. A drive shaft channel 12 extends radially outwardly from the housing 11 to the exterior wall of the base 1. Positioned within this channel is a drive shaft 13 (Figs. 2 and 4) which is journalled in bearings 14 at its inner end and a bearing (not shown) adjacent its outer end. The outer end of the drive shaft projects through a packing gland 15 and is operatively connected to a prime mover such as electric motor 16 which is provided with a brake indicated generally at 17.

The inner end of drive shaft 13 is fitted with a drive pinion 19 that meshes with a ring bevel gear 20. This gear is carried by a stub spindle 21 that is journalled in bearings 22 which are mounted in the drive housing 11. A thrust bearing 22a is interposed between the lower end of stub spindle 21 and a bearing housing cap 25 that is bolted to the housing 11. Pivotally connected to the upper end of stub spindle 21 by means of a coupling pin 23 is a lower angular coupling member 24 which is substantially rectangular in cross section. The upper end portion of member 24 is engaged in a transverse slot that is formed in a lower angular coupling member 26 which in turn is pivotally connected to the lower end of the basket drive spindle 27 by a coupling pin 28. The drive connection between the stub spindle 21 and the basket drive spindle 27 embodies the principle of the Bartlett angular transmission which permits an angular sweep of 180° between the drive and driven shafts while maintaining a uniform angular velocity ratio of 1:1 between the shafts. A lubricator guard 29 encloses the drive connections between the spindle 27 and the drive pinion 19 as clearly shown in Fig. 4.

Secured to the drive housing 11 is a tripod bearing housing 30 for the basket drive spindle 27. As shown particularly in Figs. 1, 2 and 4, the housing 30 is provided with three legs 31 which are yieldingly fastened to the drive housing 11 by bolts 32 and interposed resilient pads 33. Preferably resilient tubes 34 enclose the bolts 32 so that the drive housing 11 is completely insulated from any vibrations which may be generated by the basket and its drive spindle 27 which are not absorbed by the drive hub during operation of the extractor, and at the same time, these yielding connections will permit a certain amount of gyratory movement of the basket and spindle with respect to the drive housing 11 and associated parts of the machine as will be explained more fully hereinafter.

The tripod housing 30 carries vertically spaced bearings 35 in which the basket drive spindle 27 is journalled. The upper end portion of the spindle is tapered to receive a drive hub 36 and a thrust bearing 37 is interposed between the hub and the upper bearing. The bottom wall 40 of the basket is sloped upwardly adjacent its central portion as indicated at 41 and this portion merges with an upstanding cylindrical central hub 42 that is connected with the drive hub 36 through a resilient vibration absorbing pad 43. A similar pad 44 is interposed between the hubs 36 and 42, and a drive cap 45 is fitted over the upper end of the spindle. Nuts 46 threaded on the spindle hold the parts in position, and a cap 47 engaged over the upper end of the basket hub portion 42 provides a smooth exterior surface.

Figure 2:
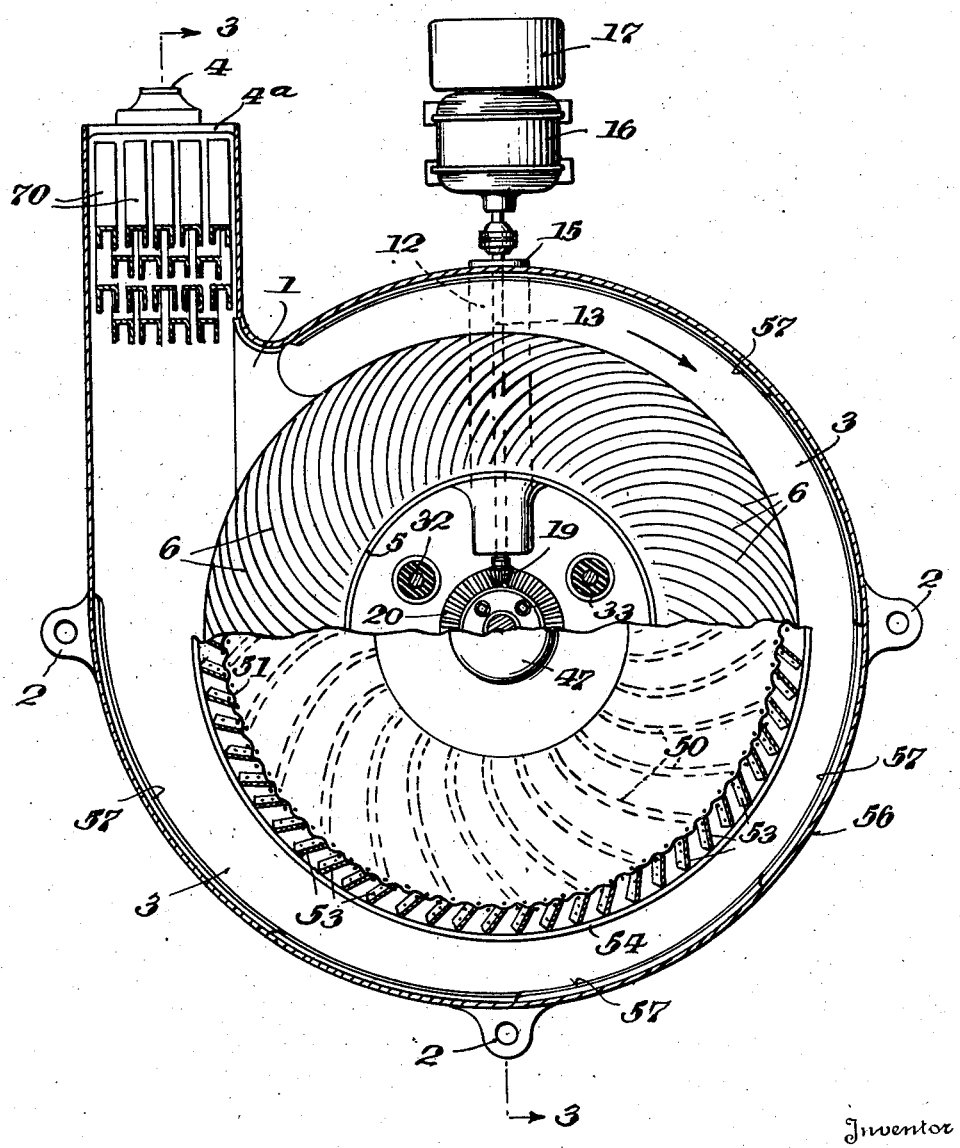
Fig. 2 is a horizontal sectional view through the lower portion of the base of the extractor with certain parts shown in elevation.
Figure 3:
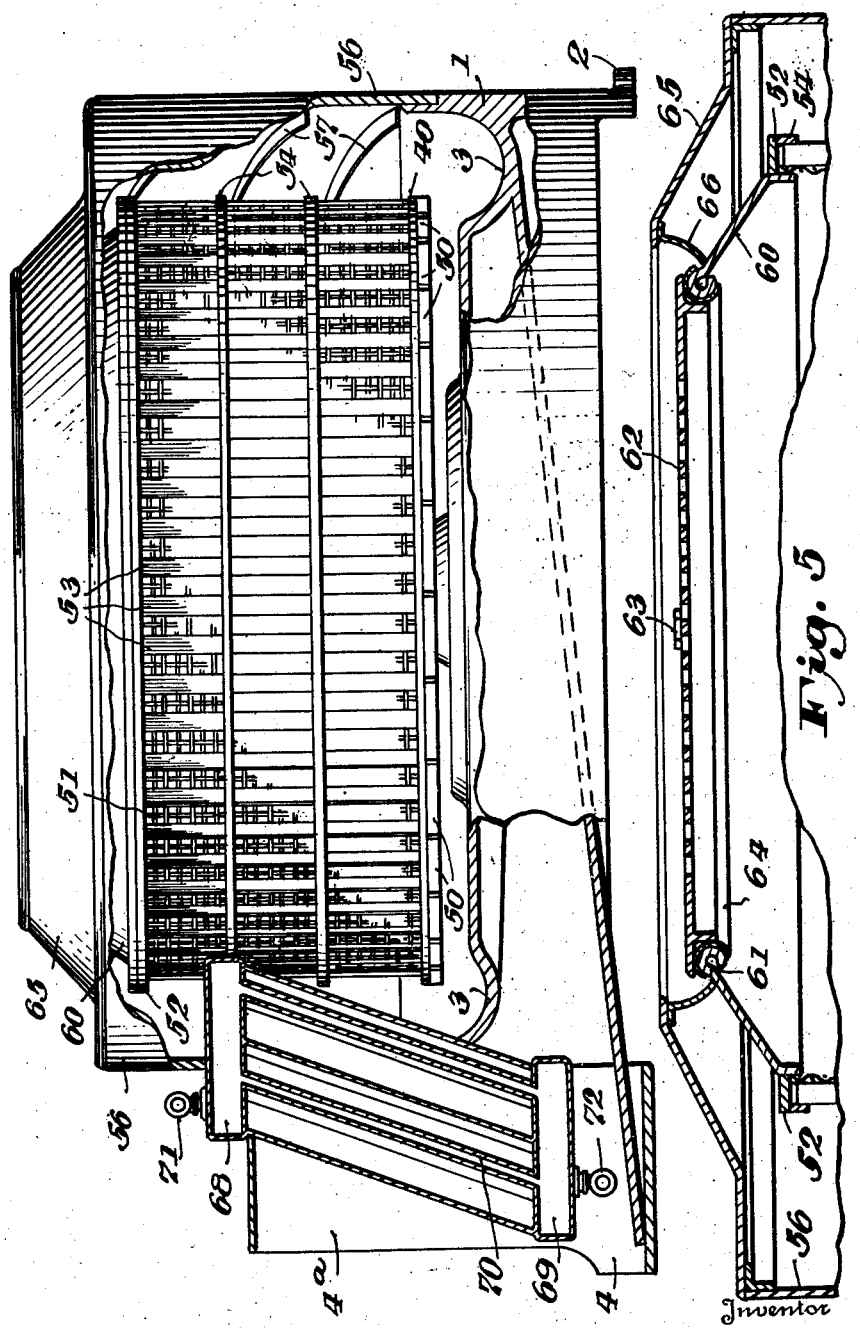
Fig. 3 is a vertical sectional view taken on the line 3—3 of Fig. 2.

The rotary basket is best illustrated in Figs. 1-3, inclusive. The under surface of the basket bottom wall 40, intermediate the upwardly sloped portion 41 and its periphery, is provided with a plurality of spiral-shaped fluid impeller ribs 50 which are arranged with their convex sides facing in the direction of rotation of the basket. During rotation of the basket these impeller ribs in cooperation with the upper surfaces of base 1 function as a centrifugal liquid pump to cleanse that portion of the curb base between guide ring 5 and channel 3 and to drive the expelled liquid out of the extractor. They also serve to reinforce the bottom of the basket. The basket side wall 51 is in the form of a relatively closely meshed screen so as to provide a maximum ratio of openings to solid wall area. Interposed between the peripheral portion of the basket bottom plate 40 and an annulus 52 secured to the top perimeter of the basket side wall are a plurality of vertically disposed impeller blades 53. As clearly shown in Figs. 1 and 2, these blades are arranged on the exterior surface of the basket screen side wall and serve to reinforce the screen and prevent bulging or buckling thereof during rotation of the basket. Further reinforcement is obtained by means of a plurality of circular reinforcing bands 54 that are spaced vertically along the outer edges of the impeller blades. The impeller blades are preferably slightly arcuate in cross section and as shown in Fig. 2, the blades are arranged with their concave surfaces facing the direction of rotation of the basket which is clockwise as seen in this figure. This arrangement of the blades is to further aid the separation of the liquid from the air stream as will be more fully explained hereinafter.

Rising from the peripheral edge of the base 1, is a side wall 56 also volute in cross section as clearly shown in Fig. 2. This side wall completely encloses the basket and merges into a fluid discharge outlet 4a arranged tangentially of the housing as shown in Fig. 2. The inner surface of the volute portion of the housing 56 is provided with a plurality of spirally-shaped deflector vanes 57 as clearly shown in Figs. 1 and 3. As illustrated in Fig. 2, these vanes are arranged around the inner surface of wall 56 from a point adjacent the small end of channel 3 to a point adjacent the liquid discharge outlet 4. These vanes serve to guide the expelled liquid downwardly to the channel 3 to separate the liquid so that it may be pumped or it can drain freely to the liquid outlet 4.

The upper end portion of the basket is fitted with a frusto-conical sheet metal member 60, the upper peripheral edge of which is rolled over to provide a smooth surface as indicated at 61 in Fig. 5. A perforated cover 62 is hinged by means of a conventional hinge element at 63 to a ring 64 that conforms to rolled edge 61 and which is slidably mounted for rotation on this rolled edge 61. With this arrangement, it is immaterial as to the position in which the basket stops, since the operator can easily rotate the hinge ring 64 by grasping the edge of cover 62 and exerting a turning motion thereon to place the hinge at a point diametrically opposite to himself and thus conveniently gain access to the interior of the basket. When the cover is closed, the perforations therein permit a free flow of air therethrough to the interior of the basket. The enclosure wall 56 for the basket is also provided with a top cover plate 65 which carries a depending baffle or sealing and guiding ring 66 adjacent its inner peripheral edge. A telescopic air duct to be described hereinafter is adapted to engage the peripheral edge of the opening in cover plate 65.

Positioned in the fluid discharge outlet 4a is a condensing unit comprising an upper header 68, a lower header 69, and a plurality of hollow channel-shaped conduits 70 interconnecting said headers. The upper header is provided with an intake connection 71 and the lower header is fitted with an outlet connection 72. This condenser unit is particularly useful when the extractor is used in dry cleaning operations as it serves to condense the solvent vapors from the air stream passing through outlet 4a. A large percentage of the solvent is thus recovered and the exhaust air stream is materially deodorized.

Arranged above the extractor and preferably used in connection therewith is an air filtering and heating unit. As illustrated in Fig. 1, this unit comprises a housing 75, within the upper portion of which is positioned an air filtering and cleaning element 76 of any suitable or approved type. The lower portion of this housing contains an air heating element 77 having an inlet 78 and an outlet 79 for connection to a source of steam or other heating medium. The bottom 80 of the housing 75 is frustro-conical in shape and connects with a telescopic or collapsible air duct 81. The lower peripheral edge of this duct is provided with a sealing ring 82 which is adapted to engage with the peripheral edge of the opening in cover plate 65 to provide a detachable connection therebetween. Suitable counterweights 84 are suspended from cables 85 that pass over pulleys 86 and are connected to the sealing ring 82. The weights 84 are of a mass substantially equal to that of the collapsible air duct 81 and associated parts so that the duct will remain in any adjusted position, either raised, lowered into engagement with the cover plate 65, or in any intermediate position. This arrangement facilitates the raising and lowering of the telescopic air duct.

In operation, the materials from which liquid is to be extracted are loaded into the basket and distributed as evenly as practical about the spindle 27. The cover 62 is then closed and the telescopic air duct is lowered so that the sealing ring 82 engages with the peripheral edge of the opening in cover plate 65. The use of cover 62 prevents the operator from overloading the basket as this cover must be closed before the extractor can be safely operated. The electric motor 16 or other prime mover is now energized to rotate the basket. Liquid is expelled from the material by centrifugal force and also by reason of the air currents passing through the basket and materials therein. The liquid passes freely through the screen wall of the basket and strikes the inner surface of wall 56. The liquid is then separated and deflected downwardly to channel 3 by action of the separating deflector vanes 57. This expelled liquid flows downwardly with a minimum rebound toward the basket and out the fluid discharge opening 4a because the volute shape of the curb avoids a build-up of back pressure. Any mist and vapors are liquefied by the condensing unit and discharged out of the housing as quickly as they are formed. Any liquid that tends to be splashed from the wall 56 to the top surface of the base is constantly forced outwardly to channel 3 by reason of the pumping action developed by rotation of the basket and the impeller ribs 50 on the under surface thereof. The pumping action created by these impeller ribs thus prevents recirculation of air and liquids over the base during operation of the extractor. Furthermore, the volute shape of the casing enclosing the basket together with separating deflector vanes 57 also prevents the extracted liquid from rebounding from the side walls and striking the basket but instead permits a free and unobstructed flow of air and liquid to the outlet openings 4a and 4. Since the extracted liquids in the form of atomized particles and vapors are being constantly forced outwardly from the rotating basket toward the volute housing therefor, and thence to the discharge opening for the casing, it is obvious that a partial vacuum will be created within the housing. The aforementioned baffle or sealing ring 66 acts as a barrier to prevent strong air currents from bypassing the basket and flowing directly into the housing or curb. When the extractor is operated without the air filter and heating unit, this seal effectively prevents moisture-laden air or air saturated with solvents from escaping into the room or mixing with the air flowing into the top of the basket and thus being recirculated. When the air filter and heating unit is used, a further seal is effected between ring 82 and the peripheral edge of the opening in cover plate 65, thus additionally preventing the escape of air laden vapors into the room. In cases where the extracted liquid is in the form of chlorinated solvents or are of an inflammable nature, the dangers of these vapors in the room from a health standpoint and/or fire hazard are obvious. Even water vapor escaping at this point into the room would create an undesirable dampness and high humidity deteriorating to the equipment. With the aforementioned seal 66 between the housing and basket and the seal between the air duct 81 and the housing, the vapors are effectively confined within the extractor housing until they are separated, liquefied and then discharged through the casing outlet.

Meanwhile, rotation of the basket with the reinforcing impeller blades 53 thereon has created a movement of air through the filtering and cleaning element 77 and through the telescopic duct 81 into the basket. In effect, the rotating basket positioned in the volute housing and provided with peripherally disposed impeller blades 53, is a giant fan, and the air thus drawn into the basket is expelled with minimum effort through the screen wall of the basket and out of the fluid discharge outlet 4a. A peculiarity of this type of basket is that the liquids and air leave the tips of the impeller blades at a velocity of about 80% in excess of the peripheral speed of the basket rim, due to the volute shape of the housing and the impeller surrounded screen basket wall. The velocity of the air into the basket is practically uniform over the entire area of exposed materials. Liquid removal from the air stream passing through the basket screen wall is based upon the principle that a non-elastic body tends to move in a straight line. The liquid entrained in the air stream flowing through the materials in the basket is precipitated therefrom by abruptly changing the direction of the air stream and immediately reducing its velocity. This is accomplished by the arrangement of the impeller blades 53 as shown in Fig. 2. Moisture-laden air is drawn through the screen side wall of the basket by the aspirating effect of the impeller blades. Due to the angular arrangement of the impeller blades 53 with respect to the direction of rotation of the basket, the direction of the moisture-laden air stream will be abruptly changed as it passes over the impeller blades and hence the moisture will be precipitated therefrom. This precipitation is aided by immediately reducing the velocity of the air stream by reason of its discharge in the volute space between the basket and housing 56. The reduced velocity of the air stream forces the separated liquids to the surface of the wall 56 and effectively prevents the air stream from picking up and carrying globules of liquid over the tips of the deflecting separator vanes 57. The normal flow of air is away from the accumulation of liquid at the base of the deflecting vanes 57. Any liquid not precipitated from the air stream as above described will be precipitated by the condenser unit positioned in the fluid outlet opening 4a and discharged through liquid outlet 4.

Figure 6:
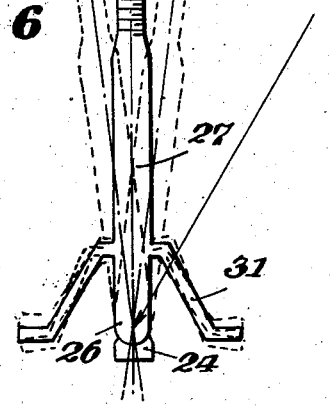
Fig. 6 is a diagrammatic view illustrating the gyrating motion of the basket spindle due to unbalanced loads.

As has been previously referred to, it is a practical impossibility to load the materials into the basket so that they will be evenly distributed therein. Hence when the basket is rotated, it will tend to rotate about its center of gravity which will not coincide with the axis of the basket spindle 27. This would tend to cause a gyratory movement of the basket and severe vibration of the entire machine if it were not for the novel arrangement of the drive hub mounting and drive spindle for the basket. As indicated diagrammatically in Fig. 6, the gyratory movement of the basket causes the upper end of the drive spindle 27 to move in a circular path whose center of rotation is about the slotted connection between the members 24 and 26. This gyratory motion is restrained, however, by the tripod housing 30 and the vibrations set up therein are dampened by the resilient pads 33 and tubes 34 surrounding the bolts 32 so that transmission of vibrations to the base 1 are reduced to a minimum. The use of resilient pads 43 and 44 between the basket hub 42 and drive hub 36 also effectively dampens vibration set up by the basket and permits a small and limited relative movement between the basket and spindle. In fact, the vibrations that are generated are so effectively dissipated that the extractor operates quietly and there is no tendency for the machine to move from its support even if not fastened down by the legs 2. A further contributory feature to the elimination of vibration resides in the use of the previously mentioned Bartlett angular transmission whereby the drive shaft stub spindle 21 and the basket spindle 27 maintain equal angular velocities even during gyratory motion of the basket and spindle 27. Hence there is no tendency for the basket to increase and decrease its angular velocity twice during each revolution as would be the case if an ordinary universal joint was used in the drive transmission. After the liquid is expelled from the material in the basket, the motor 16 is deenergized and the rotary movement of the basket is brought to a stop by application of the brake 17. The telescopic air duct 81 is then raised and the cover 62 removed to give access to the material in the basket.

The extractor can be operated a sufficient time to provide any degree of dryness desired in the materials. By reason of my improved design and the use of a positively created air current through the materials, the time of operation to produce a given state of dryness will be greatly reduced. This results not only in a saving of time but also a saving in power consumed and a considerable reduction on the wear and tear of the machine and associated parts.

When the liquid to be removed is in the nature of a relatively volatile solvent such as used in dry cleaning establishments, it will be found that the air current passing through the material not only effects a rapid removal of the solvent but also deodorizes the material. In such cases, the condenser unit in the fluid discharge outlet 4a effects a material saving due to the high percentage of solvent recovered.

What I claim is:

1. A pneumodynamic extractor of the character described comprising a housing volute in cross section formed with a liquid discharge channel in its lower portion communicating with a tangential discharge opening, a cylindrical basket rotatably mounted in said housing, said basket having perforated side walls permitting the passage of fluids and a solid bottom wall, and a plurality of substantially radially arranged and spirally shaped impeller ribs formed on the outer surface of the solid bottom wall of said basket to cooperate with said volute housing to centrifugally pump liquid on the base of said housing toward said channel and through said discharge opening of said housing when the basket is rotated.

2. A pneumodynamic extractor of the character described comprising a housing volute in cross section and having a tangential discharge opening, the bottom wall of said housing having a drain channel of increasing area toward said discharge opening and positioned adjacent the volute side wall of said housing, a cylindrical basket rotatably mounted in said housing having perforated side walls permitting the passage of fluids and a solid bottom wall, and a plurality of substantially radially disposed impeller ribs formed on the lower surface of said bottom wall of said basket to cooperate with said volute housing to pump liquids on the base toward said channel and through said discharge opening when the basket is rotated.

3. A pneumodynamic extractor of the character described comprising a housing volute in cross section and having tangentially disposed discharge openings, a cylindrical basket rotatably mounted in said housing, said basket having perforated side walls permitting the passage of fluids and a substantially solid bottom wall, a plurality of impeller blades arranged on said side walls with respect to said volute housing to provide a fan for accelerating air currents through the perforated side walls of said basket and out of an upper one of said tangentially disposed discharge openings, and a plurality of substantially radially arranged and spirally shaped impeller ribs arranged on the lower surface of the bottom wall of said basket to cooperate with said volute housing for pumping liquid along the base of said housing toward the side walls and through a lower one of the tangentially disposed discharge openings of said housing when the basket is rotated.

4. A pneumodynamic extractor of the character described comprising a housing volute in cross section and having upper and lower tangentially disposed discharge openings, the bottom wall of said housing being formed with a drain channel of increasing area toward the lower of said discharge openings and positioned adjacent the volute side wall of said housing, a plurality of spirally-shaped vanes on the inner wall of said housing arranged to separate gases and liquids and to deflect liquids toward said drain channel, a cylindrical basket rotatably mounted in said housing having perforated side walls permitting the passage of fluids, a plurality of impeller blades arranged substantially parallel with the axis of rotation of said basket and associated with said perforated side walls to cooperate with said volute housing to provide a fan for accelerating air currents through the basket and out the upper of said discharge openings when the basket is rotated, and a plurality of substantially radially disposed impeller ribs arranged on the lower surface of the bottom wall of said basket cooperating with said volute housing to pump liquid deflected into the base of said housing toward said drain channel and out the lower discharge opening when the basket is rotated.

5. A pneumodynamic extractor comprising a housing volute in cross section having an access opening formed in its upper portion and a tangential discharge opening, a basket rotatably mounted in said housing having an open top and cylindrical side walls formed of closely meshed screen whereby a maximum ratio of area of openings to solid wall area is obtained, a circularly-shaped sealing ring supported with its outer periphery adjacent the access opening of said housing and extending radially inwardly from the volute housing wall with its inner periphery adjacent the upper side wall of said basket in a manner effectively sealing the space between the housing and the basket to prevent the passage of air between said access opening and said space, and a plurality of impeller blades arranged on the side walls of said basket substantially parallel to its axis of rotation and cooperating with said volute housing to provide a fan for drawing air currents through said access opening and said open top when said basket is rotated to force fluids through the foraminous side walls of said basket and out said discharge opening.

6. A pneumodynamic extractor comprising a housing volute in cross section having an access opening formed in its upper portion and a tangential discharge opening, a basket rotatably mounted in said housing having an open top and cylindrical side walls formed of closely meshed screen whereby a maximum ratio of area of openings to solid wall area is obtained, a circularly-shaped sealing ring supported with its outer periphery adjacent the access opening of said housing and extending radially inwardly from the volute housing wall with its inner periphery adjacent the upper side wall of said basket in a manner effectively sealing the space between the housing and the basket to prevent the passage of air between said access opening and said space, an air filtering unit supported above said housing, a telescopic air duct carried by said unit and detachably connectible to the housing around said access opening, and a plurality of impeller blades arranged on the side walls of said basket substantially parallel to its axis of rotation and cooperating with said volute housing in a manner to provide a fan for drawing air currents through said filter unit and said telescopic air duct when said basket is rotated to force fluids through the foraminous side walls of said basket and out said discharge opening.

7. A pneumodynamic extractor comprising a housing formed with a volute shaped liquid discharge channel in its lower portion communicating with a tangential discharge opening, a cylindrical basket rotatably mounted in said housing, said basket having foraminous side walls permitting the passage of fluids when the basket is rotated, a plurality of impeller ribs substantially radially arranged on the outer bottom wall of said basket cooperating with said volute channel to centrifugally pump fluids into said channel and through said discharge opening when the basket is rotated.

8. A pneumodynamic extractor comprising a housing volute in cross section and having an access opening formed in its upper portion and a tangential discharge opening, a cylindrical basket rotatably mounted in said housing, said basket having perforated side walls permitting the passage of fluids and a substantially solid bottom wall, a circularly shaped sealing ring supported with its outer periphery adjacent the access opening of said housing and extending radially inwardly from the volute housing wall with its inner periphery adjacent the upper side wall of said basket in a manner effectively sealing the space between the housing and the basket to prevent the passage of air between said access opening and said space, a plurality of impeller blades arranged on said side walls substantially parallel to the axis of rotation of the basket and cooperating with said volute housing to provide a fan for accelerating air currents through the perforated side walls of said basket and out said tangential discharge opening, and a plurality of impeller ribs substantially radially arranged on the lower surface of the bottom wall of said basket cooperating with said volute housing for pumping liquid along the base of said housing toward the side walls and through said discharge opening when the basket is rotated.

9. A pneumodynamic extractor comprising a housing volute in cross section and having upper and lower tangentially disposed discharge openings, the bottom wall of said housing being formed with a drain channel of increasing area toward the lower of said discharge openings and positioned adjacent the volute side wall of said housing, a plurality of spirally-shaped vanes on the inner wall of said housing arranged to separate gases and liquids and to deflect liquids toward said drain channel, a cylindrical basket rotatably mounted in said housing having perforated side walls permitting the passage of fluids, a plurality of impeller blades arranged on said side walls substantially parallel to the axis of rotation of the basket and cooperating with said volute housing to provide a fan for accelerating air currents through the basket and out the upper of said discharge openings when the basket is rotated, a plurality of substantially radially disposed impeller ribs arranged on the lower surface of the bottom wall of said basket cooperating with the volute housing to pump liquid deflected onto the base of said housing toward said drain channel and out the lower of said discharge openings when the basket is rotated, and a condenser unit located in the upper of said discharge openings for precipitating liquids from said air currents into said drain channel.

PATRICK A. BAYLESS.